United States Patent [19]

Morimoto

[11] Patent Number: 4,936,403

[45] Date of Patent: Jun. 26, 1990

[54] DRIVE SPEED CONTROL SYSTEM FOR A MOTOR VEHICLE HAVING A CONTINUOUSLY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 232,797

[22] Filed: Aug. 16, 1988

[30] Foreign Application Priority Data

Aug. 25, 1987 [JP] Japan .................................. 62-212190

[51] Int. Cl.$^5$ ............................................. B60K 31/10
[52] U.S. Cl. ................................ 180/176; 364/426.04; 364/424.1
[58] Field of Search .................. 180/178, 179, 176; 364/426.04, 424.1; 74/866

[56] References Cited

U.S. PATENT DOCUMENTS

| | | | |
|---|---|---|---|
| 4,451,888 | 5/1984 | Kuno et al. | 180/176 |
| 4,546,673 | 10/1985 | Shigematsu et al. | 74/866 |
| 4,683,779 | 8/1987 | Osanai et al. | 74/866 X |
| 4,708,031 | 11/1987 | Morimoto et al. | 74/866 |
| 4,709,595 | 12/1987 | Hayama | 180/176 |
| 4,771,656 | 9/1988 | Itoh et al. | 74/866 |
| 4,794,819 | 1/1989 | Tanaka et al. | 74/866 |
| 4,803,900 | 2/1989 | Ohkumo | 74/866 |

FOREIGN PATENT DOCUMENTS 60-135335  7/1985  Japan .............................. 364/426.04

Primary Examiner—Charles A. Marmor
Assistant Examiner—Tamara L. Finlay
Attorney, Agent, or Firm—Martin A. Farber

[57] ABSTRACT

A control system for a motor vehicle has a continuously variable transmission, a transmission ratio control system for controlling the transmission ratio, and a cruise control system for controlling speed of the vehicle to a desired cruising speed. The transmission ratio is controlled to a desired transmission ratio in accordance with load on the engine. The desired transmission ratio is further determined in accordance with the desired cruising speed.

4 Claims, 5 Drawing Sheets

4,936,403

DRIVE SPEED CONTROL SYSTEM FOR A MOTOR VEHICLE HAVING A CONTINUOUSLY VARIABLE TRANSMISSION

BACKGROUND OF THE INVENTION

The present invention relates to a system for controlling the transmission ratio of a transmission and the opening degree of a throttle valve for a motor vehicle.

Generally, a control system for a constant speed drive (hereinafter called a cruise control system) for a motor vehicle having a continuously variable belt-drive automatic transmission (CVT) is separate from a transmission ratio control system. Namely, the cruise control system operates to independently control a throttle valve of an engine regardless of the transmission ratio, so that the constant speed drive may be held. However, if load on the engine of the vehicle greatly changes, the constant speed drive cannot be maintained. For example, when the vehicle goes up a hill, the throttle valve is opened for increasing the engine power. When the throttle opening degree approaches a full-throttle position, the engine power is no longer increased. Accordingly, the vehicle speed becomes lower than the desired vehicle speed for the constant speed drive, since the transmission ratio is not controlled for the cruise control.

Japanese Patent Application Laid-Open No. 60-135335 discloses a cruise control system for a motor vehicle with a CVT wherein a current control means is provided for controlling current passing to a vacuum operated throttle actuator in accordance with the difference between a set vehicle speed Vs and an actual vehicle speed V. Correcting means is provided for correcting transmission ratio i for the transmission in accordance with current or a control signal for the current control means, thereby controlling the actual vehicle speed V to the set vehicle speed Vs.

In the conventional system, the transmission ratio i is corrected in accordance with an electric signal supplied to the vacuum operated actuator. However, the control operation of the actual vehicle speed is performed with a slight delay of time after the generation of the signal to the actuator. Accordingly, the engine power can not be properly controlled upon a large change of the engine load.

SUMMARY OF THE INVENTION

The object of the present invention is to provide a cruise control system for a motor vehicle which improves driveability for a constant speed drive, by controlling a throttle valve based on the control of the transmission ratio of a CVT.

Generally according to the invention the transmission ratio is controlled based on a desired cruising speed responsive to an output signal of a vehicle speed sensor, and the throttle valve is controlled by an actuating means responsive to the desired cruising speed.

The other objects and features of this invention will become understood from the following description with reference to the accompanying drawings.

DETAILED DESCRIPTION OF THE PREFERRED EMBODIMENT

Figure 1:
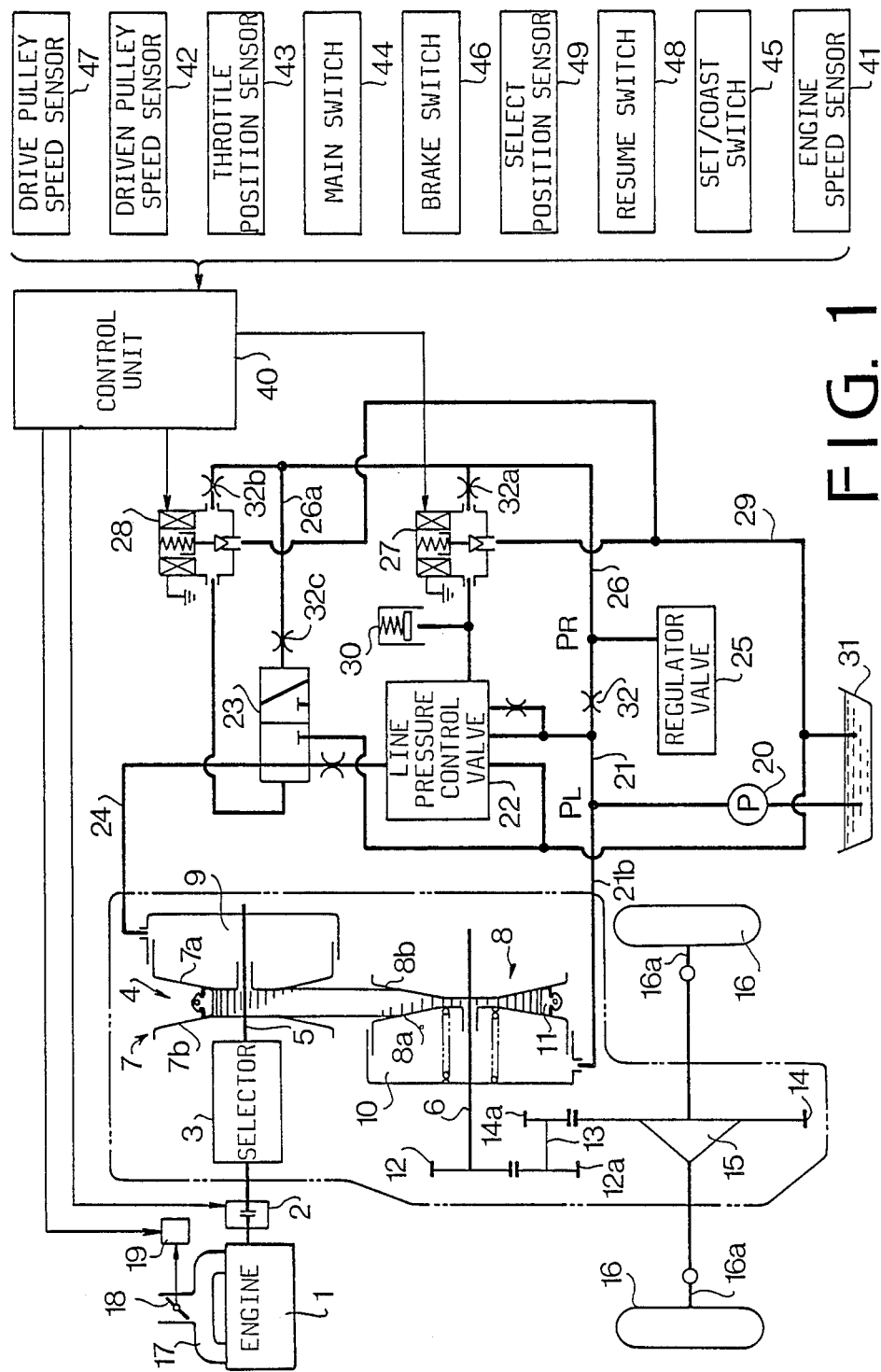
FIG. 1 is a schematic illustration of a power transmission system including a continuously variable belt-drive transmission for a motor vehicle according to the present invention.

Referring to FIG. 1, a motor vehicle is provided with an engine 1, and an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9 formed on the main shaft 5 to provide a servo device.

A fixed conical disc 8b of the driven pulley 8 is formed on the output shaft 6 opposite a movable conical disc 8a. The conical disc 8a has a cylindrical portion which is slidably engaged in a cylinder 10 of the output shaft 6 to form a servo device. A drive belt 11 engages with the drive pulley 7 and the driven pulley 8.

The cylinder 9 of the drive pulley 7 is so designed that the pressure receiving area thereof is larger than that of the cylinder 10 of the driven pulley 8. Thus, the running diameter of the drive belt 11 on the pulleys is varied by hydraulic pressure control of the cylinder 9 dependent on driving conditions.

Secured to the output shaft 6 is a drive gear 12 which engages with an intermediate reduction gear 12a on an intermediate shaft 13. An intermediate gear 14a on the shaft 13 engages with a final gear 14. The rotation of the final gear 14 is transmitted to axles 16a of vehicle driving wheels 16 through a differential 15.

A throttle valve 18 is mounted in an intake manifold 17 of the engine 1. An actuator 19 is operatively connected to the throttle valve 18 for controlling the throttle valve in accordance with an output signal from a control unit 40.

Describing a hydraulic circuit of the transmission 4, the cylinder 9 of the drive pulley 7 is supplied with pressurized oil by an oil pump 20 from an oil reservoir 31 passing through a line pressure passage 21, a line pressure control valve 22, transmission ratio control valve 23, and passage 24. The cylinder 10 of driven pulley 8 is applied with pressurized oil through a passage 21b. The passage 21 is further communicated with a regulator valve 25 through an orifice 32. A constant pressure of oil regulated at the regulator valve 25 is provided in a passage 26. The passage 26 is communicated with an end chamber of the line pressure control valve 22, a solenoid operated on-off valve 27 and an accumulator 30 through an orifice 32a, with an end chamber of the transmission ratio control valve 23 and a solenoid operated valve 28 through an orifice 32b, and with the other end chamber of the valve 23 through a passage 26a and an orifice 32c. The solenoid operated valves 27 and 28 are operated by duty signals from the control unit 40. When energized, the valves are communicated with a drain passage 29. Thus, actuating pressures controlled by the on-off valves 27 and 28 are applied to the control valves 22 and 23.

The line pressure control valve 22 controls the line pressure PL in accordance with the transmission ratio.

The transmission ratio control valve 23 has a spool which is shifted to an oil supply position by control oil in its opposite end chambers, communicating the passage 21 with the passage 24, and respectively, to an oil drain position for draining the oil from the passage 24. The operating conditions in the two positions vary in accordance with the duty ratio, so that the flow rate of oil supplied to or drained from the cylinder 9 of the drive pulley 7 is controlled to provide optimum transmission ratio in dependency on the opening degree of the throttle valve and the speed of the engine.

The control unit 40 consisting of a microcomputer is provided with the transmission ratio control system and the line pressure control system, to which the cruise control system is operatively connected.

Figure 2:
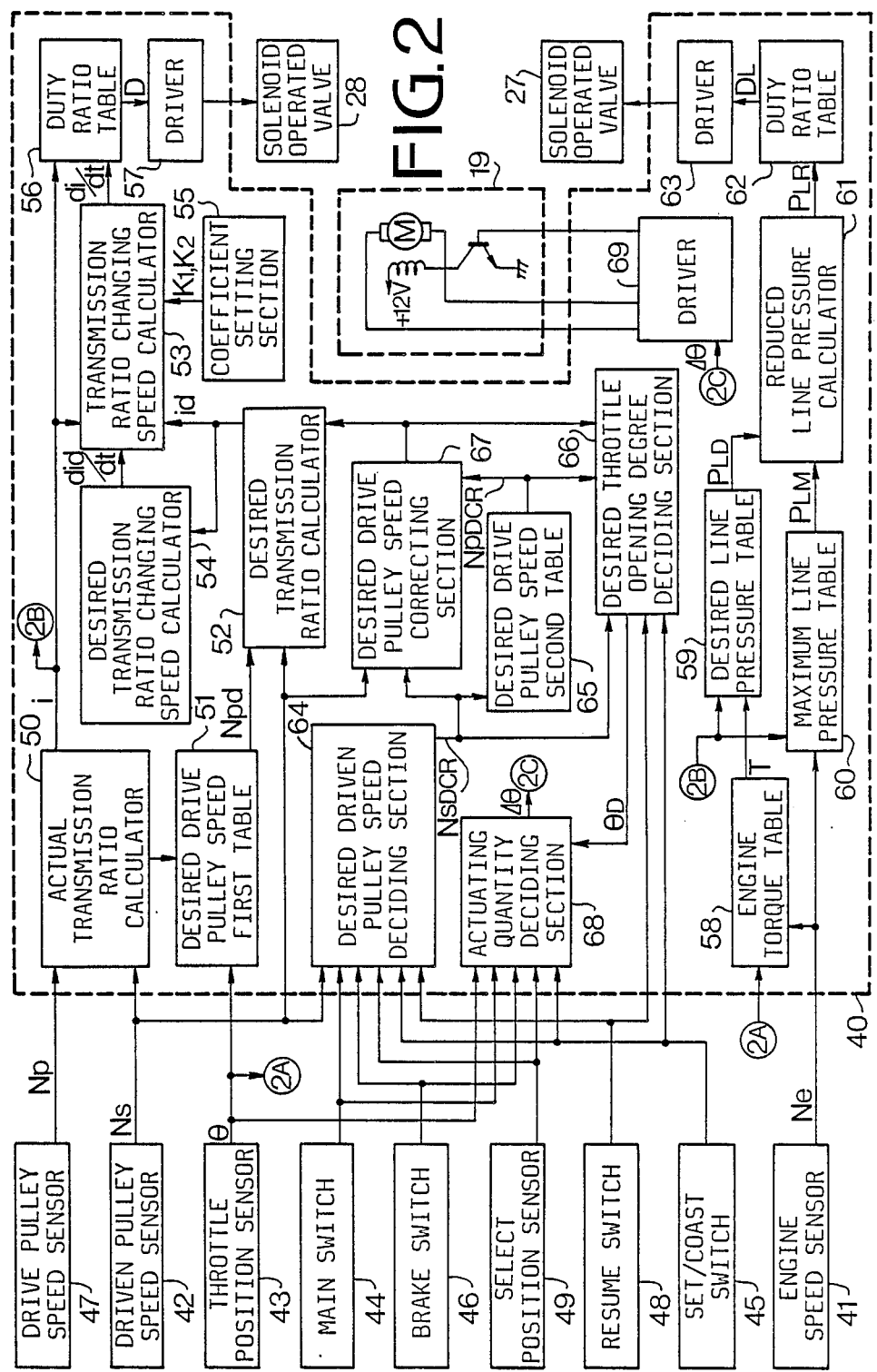
FIG. 2 shows a block diagram of a control unit of the system according to the present invention.

Referring to FIG. 2, the control unit has a drive pulley speed sensor 47, driven pulley speed sensor 42, throttle valve position sensor 43, main switch 44 for starting the cruise control, set/coast switch 45, brake switch 46, engine speed sensor 41, resume switch 48, and select position sensor 49. The set/coast switch 45 is adapted to produce a cruise set signal when a button of the switch is depressed for a short period and to produce a coast signal while the button is continuously depressed over a predetermined period.

The system for controlling the transmission ratio and the line pressure will be described. Output signals $N_P$ and $N_S$ of sensors 47, 42 are fed to an actual transmission ratio calculator 50 to produce an actual transmission ratio i in accordance with $i = N_P/N_S$. The actual transmission ratio i and output signal $\theta$ of the throttle position sensor 43 are fed to a desired drive pulley speed first table 51 to derive a desired drive pulley speed Npd in accordance with values of the ratio i and signal $\theta$. The desired drive pulley speed Npd and the driven pulley speed Ns are fed to a desired transmission ratio calculator 52 to calculate a desired transmission ratio id in accordance with the speeds Npd and Ns which corresponds to vehicle speed.

The desired transmission ratio id is fed to a desired transmission ratio changing speed calculator 54 which produces a desired transmission ratio changing rate did/dt. The rate did/dt is the amount of change of the desired transmission ratio id during a predetermined time interval. A coefficient setting section 55 is provided for producing coefficients K1 and K2. The actual transmission ratio i, desired transmission ratio id, desired transmission ratio changing speed did/dt and coefficients K1 and K2 are applied to a transmission ratio changing speed calculator 53 to produce a transmission ratio changing rate di/dt from the following formula.

$$di/dt = K1(id - i) + K2 \cdot did/dt$$

In the formula, the term of (id−i) is a control quantity dependent on the difference between the desired and actual transmission ratios and did/dt is a term for advancing the phase of the control operation.

The rate di/dt and actual ratio i are applied to a duty ratio table 56 to derive a duty ratio D in accordance with $D = f(di/dt, i)$ using a table at upshift and downshift of the transmission. The duty ratio D is supplied to the solenoid operated on-off valve 28 through a driver 57.

On the other hand, engine speed Ne from the engine speed sensor 41 and throttle opening degree $\theta$ from the throttle position sensor 43 are applied to an engine torque table 58 to derive an engine torque T. The engine torque T and the actual transmission ratio i from the calculator 50 are applied to a desired line pressure table 59 to derive a desired line pressure $P_{LD}$.

In the hydraulic circuit 20, oil pressure discharged from the pump varies in accordance with a change of the engine speed Ne, so that a maximum line pressure $P_{LM}$ also varies. In order to detect the variance of the maximum line pressure $P_{LM}$, the control unit is provided with a maximum line pressure table 60 to which the engine speed Ne and the actual transmission ratio i are supplied. Therefore, the maximum line pressure $P_{LM}$ is obtained.

The desired line pressure $P_{LD}$ and the maximum line pressure $P_{LM}$ are applied to a reduced line pressure calculator 61 wherein a reduced line pressure $P_{LR}$ is calculated based on the proportion of the desired line pressure $P_{LD}$ to the maximum line pressure $P_{LM}$. The reduced line pressure $P_{LR}$ is applied to a duty ratio table 62 to derive a duty ratio $D_L$ corresponding to the reduced line pressure $P_{LR}$. The duty ratio $D_L$ is supplied to a driver 63 which operates the solenoid operated on-off valve 27 at the duty ratio.

Describing the system for the cruise control, a desired driven pulley speed deciding section 64 is applied with the driven pulley speed signal Ns from the sensor 42, and output signals from the switches 44, 45, 46, 48 and the sensor 49.

When the main switch 44 for the cruise control is turned on and the set/coast switch 45 operates for a short period to produce the cruise signal, the desired driven pulley speed deciding section 64 operates to set the driven pulley speed Ns applied to the section 64 at that time as a desired driven pulley speed $N_{SDCR}$, that is a desired cruising speed.

On the other hand, when the brake switch 46 is turned on, or the set/coast switch 45 and the resume switch 48 are on at the same time, or the select position sensor 49 produces a signal representing ranges other than a D range, or the main switch 44 is turned off, the section 64 operates to cancel the cruise control, so that the desired driven pulley speed $N_{SDCR}$ and the amount for actuating the throttle actuator 19 becomes zero.

At setting of the cruise control, the section 64 derives the desired driven pulley speed $N_{SDCR}$ in accordance with the driven pulley speed Ns. The output signal $N_{SDCR}$ is fed to a desired drive pulley speed second table 65 from which a desired drive pulley speed for the cruise control $N_{PDCR}$ is derived, and fed to a desired throttle valve opening degree deciding section 66.

Figure 4:
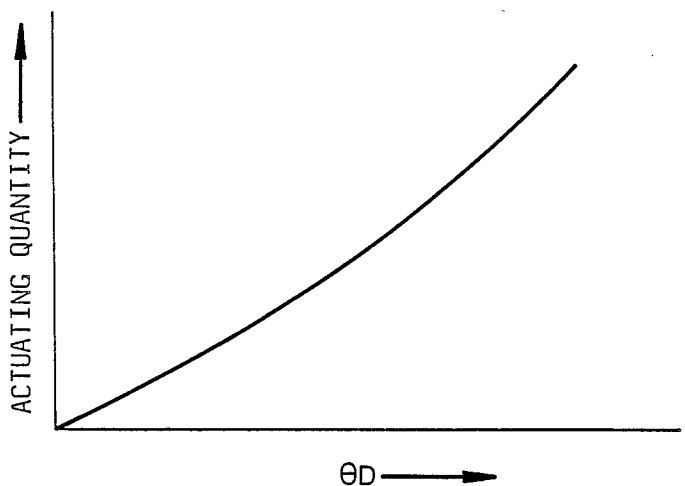
FIG. 4 is a graph showing a relationship between throttle opening degree and actuating quantity.

The desired throttle valve opening degree deciding section 66 is further applied with a signal $|\Delta Npd|$ from a desired drive pulley speed correcting section 67, and output signals from switches 45 and 48 to produce a desired throttle valve opening degree signal $\theta D$. The signal $\theta D$ is applied to a throttle actuator actuating quantity deciding section 68, to which the signal $\theta$ from the sensor 43 and output signals from switches 44, 45, 46 and the sensor 49 are further applied. The section 68 determines an actuator actuating quantity $\Delta\theta$ in accordance with $\theta$ and $\theta D$. An output signal $\Delta\theta$ is applied to the actuator 19 comprising a DC servo motor through a driver 69. The throttle valve 18 is controlled for providing the desired opening degree $\theta D$ as shown in FIG. 4.

Figure 3:
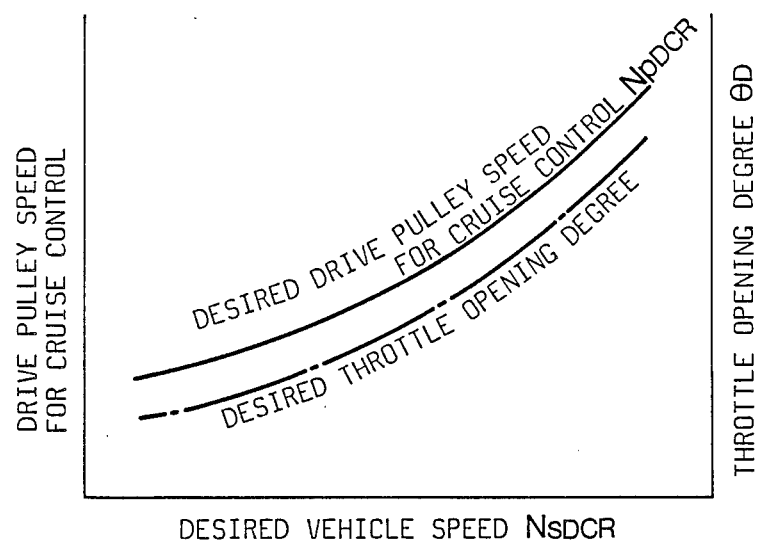
FIG. 3 is a graph showing a table for a desired drive pulley speed and a desired throttle valve opening degree for a desired vehicle speed.

The relationship between the desired vehicle speed and the desired drive pulley speed $N_{PDCR}$ for the cruise control, and between the desired vehicle speed and the desired throttle valve opening degree $\theta d$ is set as shown in FIG. 3. The desired speed $N_{PDCR}$ and opening degree $\theta D$ are set to be able to drive the vehicle on an uphill road having a larger running resistance than a level road. When the cruise control system is in operation, the transmission ratio control system is controlled in accordance with the desired drive pulley speed $N_{PDCR}$ derived from the second table 65.

The output signal $N_{PDCR}$ is applied to the section 67 which is further supplied with signals $N_{SDCR}$ and Ns from the section 64 and the sensor 42. The section 67 calculates a correcting quantity $\Delta Npd$ as a difference by subtracting the actual driven pulley speed Ns from the desired driven pulley speed $N_{SDCR}$, which is applied to the desired transmission ratio calculator 52 for correcting the desired transmission ratio id. Thus, the transmission ratio is controlled to control the vehicle speed to the desired cruising speed ($N_{SDCR}$) without changing the desired throttle opening degree $\theta D$.

However, if the quantity of deviation of the vehicle speed deviated from the desired drive pulley speed $N_{PDCR}$ set by the graph shown in FIG. 3 exceeds a predetermined value, the desired throttle valve opening degree $\theta D$ is corrected with $\Delta\theta$ little by little.

The operation of the cruise control system will be described with reference to the flow charts of FIGS. 5 and 6.

Figure 5:
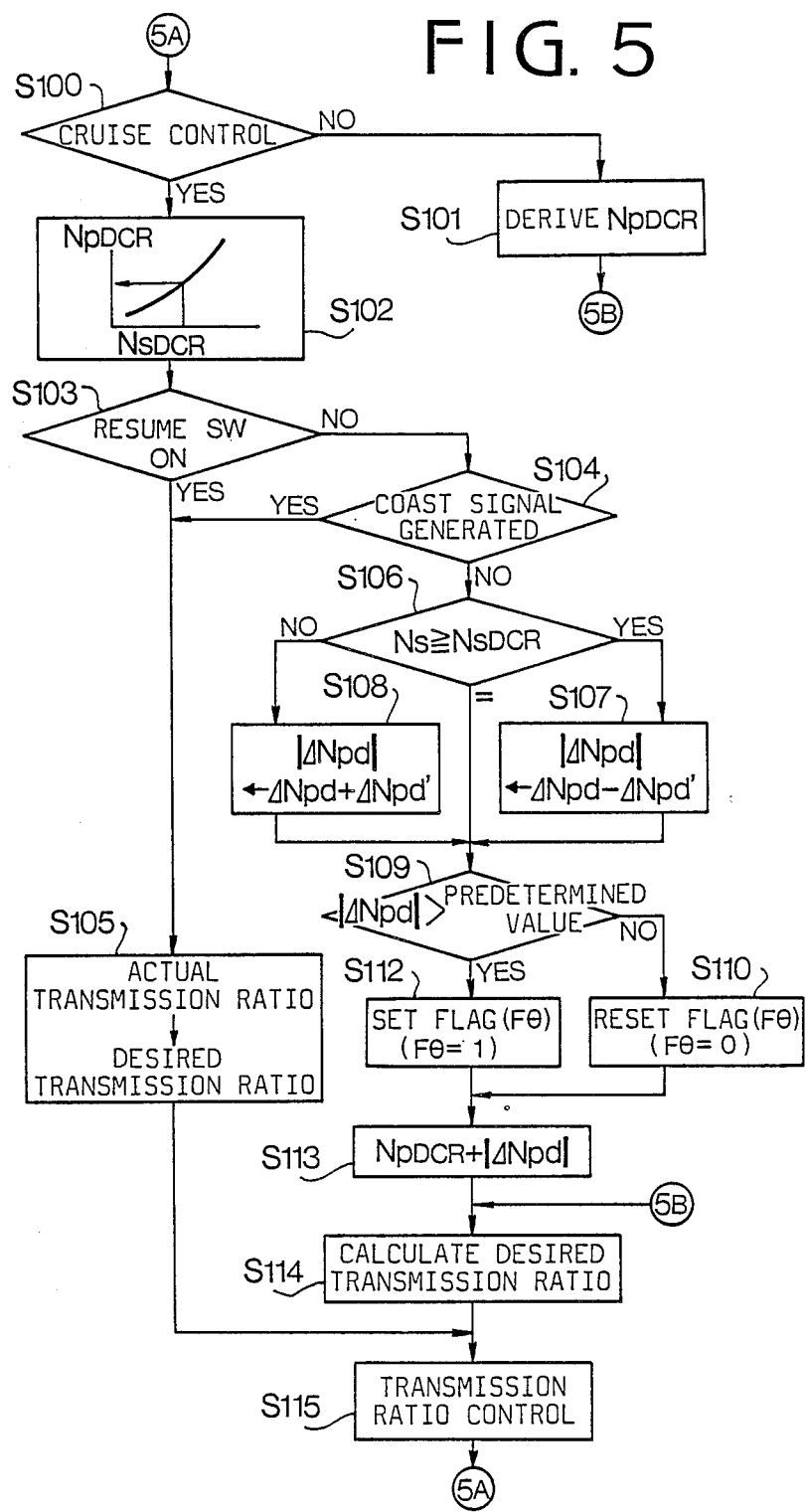
FIG. 5 is a flowchart showing the transmission ratio control operation of the system according to the present invention.

Referring to FIG. 5, it is determined whether the vehicle is in a cruise control at a step S100. If the vehicle is not in the cruise control, the program proceeds to a step S101, where the desired drive pulley speed Npd is derived from the first table 51 for the normal transmission ratio control. If the cruise control is determined at step S100, the program goes to a step S102, where the desired drive pulley speed for the cruise control $N_{PDCR}$ is obtained in accordance with the desired driven pulley speed $N_{SDCR}$ which means the desired cruising speed for the cruise control. At a step S103, if the resume switch 48 is turned on, it is determined to increase the vehicle speed in the cruise control operation. If the resume switch is turned off and the coast signal is generated (S104), it is determined that the vehicle speed is lowered. At a step S105, the actual transmission ratio i is stored as a desired transmission ratio id. While, if the coast signal is not generated at step S104, the program proceeds to a step S106. At step S106, the actual driven pulley speed Ns is compared with the desired driven pulley speed $N_{SDCR}$ for the cruise control. When $Ns > N_{SDCR}$, the program goes to a step S107, where a correcting quantity $\Delta Npd'$ is subtracted from the correcting quantity $\Delta Npd$ for obtaining a smaller correcting quantity $\Delta Npd$. When $Ns < N_{SDCR}$, $\Delta Npd'$ is added to $\Delta Npd$ at a step S108 to produce a larger quantity $\Delta Npd$. When $Ns = N_{SDCR}$, the program goes to a step S109. At step S109, the correcting quantity $|\Delta Npd|$ is compared with a predetermined value. If $|\Delta Npd|$ is larger than the predetermined value, the program goes to a step S112, where a flag $F\theta$ for correcting the desired throttle valve opening degree $\theta d$ is set ($F\theta = 1$). If $|\Delta Npd|$ is smaller than or equal to the value, the program goes to a step S110, where flag $F\theta$ is reset ($F\theta = 0$). At a step S113, the correcting quantity $\Delta Npd$ is added to the desired drive pulley speed $N_{PDCR}$ for the cruise control. At a step S114, the desired transmission ratio id is calculated. At a step S115, the normal transmission ratio control operation is achieved. The program is repeated at regular intervals.

Figure 6:
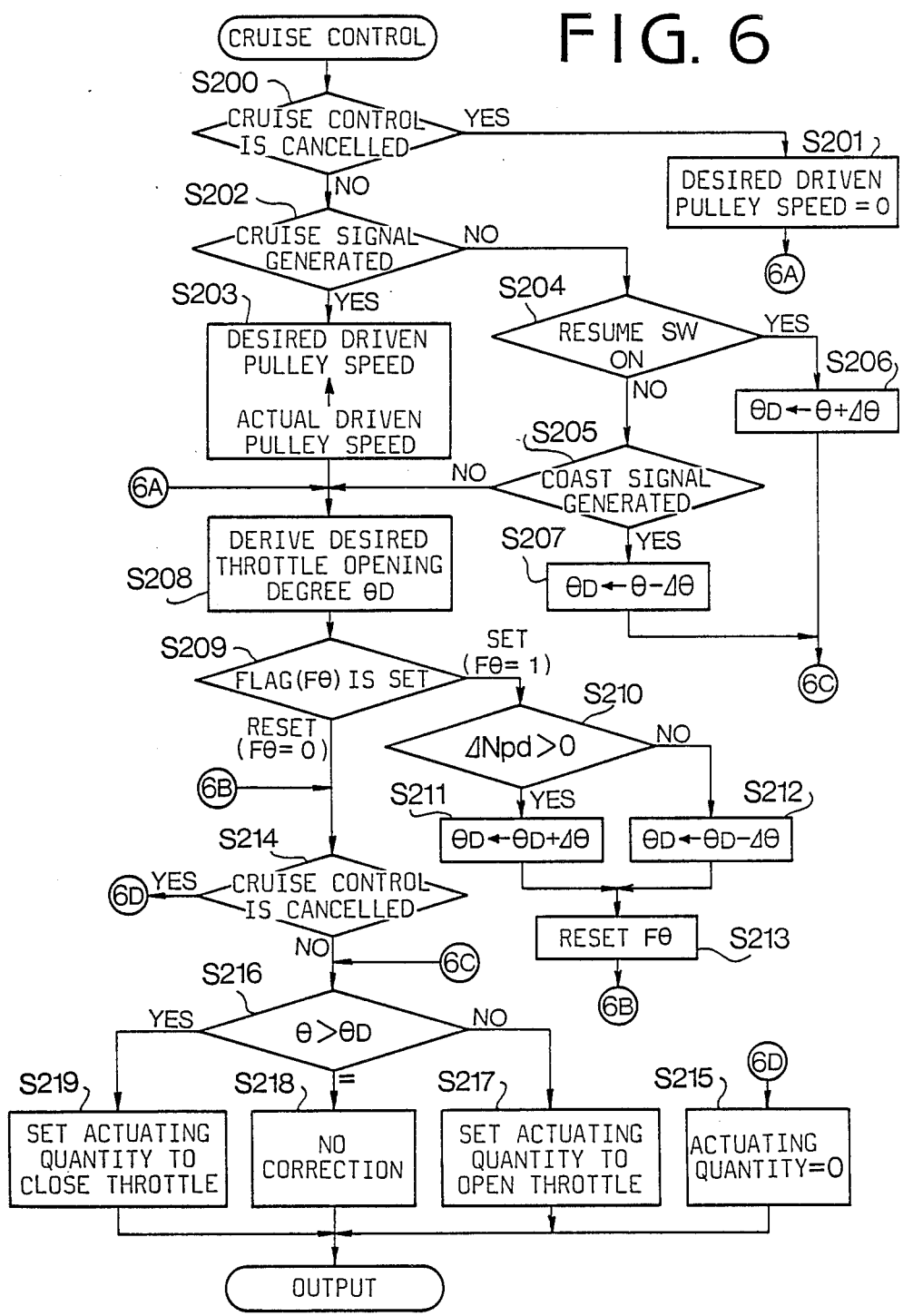
FIG. 6 is a flow chart showing the throttle valve control operation of the system.

Referring to FIG. 6 showing a correcting operation for the throttle valve opening degree, at a step S200, it is determined whether the cruise control is cancelled or not. If the cruise control is cancelled, the desired driven pulley speed $N_{SDCR}$ for the cruise control becomes zero and the actuating quantity of the actuator 19 for the throttle valve becomes zero to turn off the actuator at a step S201. The program proceeds to a step S208. If the cruise control operation continues, the program goes to a step S202, where the cruise signal from the set/coast switch 45 is detected. When the cruise signal is detected, the program goes to a step S203. At step S203, the actual driven pulley speed Ns is set as the desired driven pulley speed $N_{SDCR}$ for the cruise control. Thereafter, the program goes to step S208. If the cruise signal is not detected, that is the cruise control continues, and the resume switch is not on, the program goes to steps S204 and S205. At step S205, the coast signal from the set/coast switch 45 is determined. When the resume switch 48 is turned on, the program goes to a step S206, where actuating quantity $\Delta\theta$ is added to an actual throttle valve opening degree $\theta$ to obtain a desired throttle opening degree $\theta D$ for accelerating the vehicle. If the coast signal is detected at step S205, the actuating quantity $\Delta\theta$ is subtracted from the throttle opening degree $\theta$ at a step S207. Thus, a desired throttle opening degree $\theta D$ for decelerating the vehicle is obtained. From steps S206 and S207, the program goes to a step S216. If the coast signal is not detected at step 205, the program proceeds to the step S208. At the step 208, the desired throttle valve opening degree $\theta d$ is derived from the table shown in FIG. 3. At a step S209, it is determined whether the flag $F\theta$ exists or not. If the flag exists, ($F\theta = 1$), which means that the difference between the actual throttle opening degree $\theta$ and the desired throttle opening degree $\theta D$ is large, the desired throttle opening degree is controlled. Namely, the program goes to a step S210, where it is determined whether the correcting quantity $\Delta Npd$ is larger than zero or not. In other words, it is determined whether the actual driven pulley speed Ns is larger than the desired driven pulley speed $N_{SDCR}$ or not. If the correcting quantity $\Delta Npd$ is larger than zero ($Ns > N_{SDCR}$), the program goes to a step S211. At the step S211, the quantity $\Delta\theta$ is added to the desired throttle valve opening degree $\theta D$ to increase the desired throttle valve opening degree. To the contrary, if the correcting quantity $\Delta Npd$ is smaller than zero ($Ns < N_{SDCR}$), the program goes to a step S212, where the quantity $\Delta\theta$ is subtracted from the desired throttle valve opening degree. From steps S211 and S212, the program goes to a step S213. At a step S213, the flag $F\theta$ is reset and the program goes to a step S214. If no flag is set ($F\theta = 0$) at the step S209, the program proceeds to the step S214, where it is again determined whether the cruise control is cancelled or not. If the cruise control is cancelled, the actuating quantity becomes zero at a step S215. If the cruise control continues, the throttle opening degree $\theta$ is compared with the desired throttle opening degree $\theta D$ at a step S216. If $\theta < \theta D$ the actuating quantity of the actuator is set in a direction for opening the throttle valve at step S217. If $\theta=\theta d$, the actuating quantity is maintained at a step S218. If $\theta>\theta D$, the actuating quantity is set in a throttle valve closing direction at a step S219.

In order to control the cruise control system in accordance with the transmission ratio control and the throttle actuator control, there are two types of controls. One of the controls is that the cruise control is roughly performed by the transmission ratio i and then finely adjusted by the throttle valve opening degree $\theta$. The other is that the cruise control is roughly performed by the throttle valve opening degree $\theta$ and then finely adjusted by the transmission ratio i, which is described in the present invention. However, in the former control, the drive pulley speed is greatly changed by the delay of operation timing. Accordingly, such a control is not available to the system.

In accordance with the present invention, the cruise control system cooperates with the transmission ratio control system and the throttle valve control system. The cruise control is mainly performed based on the transmission ratio control and then performed by the throttle positioning control which follows the transmission ratio control. Thus, a smooth control is provided, thereby preventing the engine power from greatly varying. Even if the running resistance is greatly changed, the cruise control can rapidly respond, so that the constant speed drive is provided in all driving ranges.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a drive speed control system for a motor vehicle with a continuously variable transmission connected to an engine, wherein actual speed of the engine and actual transmission ratio of said transmission are automatically controlled in a cruise control mode, so that actual vehicle speed coincides with a desired vehicle speed, the engine having a throttle valve of which its opening degree is automatically changed by a throttle actuator in said cruise control mode, said continuously variable transmission having a drive pulley with a hydraulically shiftable disc and a first hydraulic cylinder for shifting the disc, a driven pulley including a hydraulically shiftable disc and a second hydraulic cylinder for operating the disc of the driven pulley and a belt engaged with both pulleys, the improvement in the system which comprises:

detecting means for detecting actual rotating speed of both said pulleys and for providing an actual drive pulley speed signal and an actual driven pulley speed signal;

an actual transmission ratio calculator responsive to said actual drive and driven pulley speed signals for calculating the actual transmission ratio;

first deciding means responsive to said actual transmission ratio and said opening degree of said throttle valve for producing a first desired drive pulley speed signal;

first calculating means responsive to said actual driven pulley speed signal for producing a desired driven pulley speed signal of said desired vehicle speed in said cruise control mode in dependency on driving conditions;

second deciding means responsive to said desired driven pulley speed signal for producing a second desired drive pulley speed signal;

correcting means responsive to said actual driven pulley speed signal and said desired driven pulley speed signal for producing a correction signal to correct said second desired drive pulley speed signal;

a desired transmission ratio calculator responsive to said actual driven pulley speed signal, said correction signal and said first desired drive pulley speed signal for calculating a desired transmission ratio;

second calculating means responsive to said desired driven pulley speed signal, said second desired drive pulley speed signal and said correction signal for calculating a correcting amount of said opening degree of said throttle valve in dependency on said driving conditions for correcting said opening degree of said throttle valve by said throttle actuator; and driving means for shifting said actual transmission ratio to said desired transmission ratio by said first hydraulic cylinder; and means for incrementally correcting a desired opening degree of said throttle valve little by little when said actual driven pulley speed signal representing the vehicle speed deviates from said second desired drive pulley speed signal by more than a predetermined value.

2. In a drive speed control system for a motor vehicle with a continuously variable transmission connected to an engine, wherein actual speed of the engine and actual transmission ratio of said transmission are automatically controlled in a cruise control mode, so that actual vehicle speed coincides with a desired vehicle speed, the engine having a throttle valve of which its opening degree is automatically changed by a throttle actuator in said cruise control mode, said continuously variable transmission having a drive pulley with a hydraulically shiftable disc and a first hydraulic cylinder for shifting the disc, a driven pulley including a hydraulically shiftable disc and a second hydraulic cylinder for operating the disc of the driven pulley and a belt engaged with both pulleys, the improvement in the system which comprises:

detecting means for detecting actual rotating speed of both said pulleys and for providing an actual drive pulley speed signal and an actual driven pulley speed signal;

an actual transmission ratio calculator responsive to said actual drive and driven pulley speed signals for calculating the actual transmission ratio;

first deciding means responsive to said actual transmission ratio and said opening degree of said throttle valve for producing a first desired drive pulley speed signal;

first calculating means responsive to said actual driven pulley speed signal for producing a desired driven pulley speed signal of said desired vehicle speed in said cruise control mode in dependency on driving conditions;

second deciding means responsive to said desired driven pulley speed signal for producing a second desired drive pulley speed signal;

correcting means responsive to said actual driven pulley speed signal and said desired driven pulley speed signal for producing a correction signal to correct said second desired drive pulley speed signal;

a desired transmission ratio calculator responsive to said actual driven pulley speed signal, said correction signal and said first desired drive pulley speed signal for calculating a desired transmission ratio;

second calculating means responsive to said desired driven pulley speed signal, said second desired drive pulley speed signal and said correction signal for calculating a correcting amount of said opening degree of said throttle valve in dependency on said driving conditions for correcting said opening degree of said throttle valve by said throttle actuator; and driving means for shifting said actual transmission ratio to said desired transmission ratio by said first hydraulic cylinder; and said second calculating means includes a desired throttle opening degree deciding means responsive to said desired driven pulley speed signal, said second desired drive pulley speed signal and said correction signal for generating a desired throttle valve opening degree signal.

3. The system according to claim 2, wherein said desired throttle opening degree deciding means generates said desired throttle valve opening degree signal when said correction signal is larger than a predetermined value.

4. The system according to claim 3, wherein said correcting means calculates said correction signal by subtracting said actual and desired driven pulley speed signals.

* * * * *